| United States Patent [19]
Orcutt et al.

[11] 3,974,359
[45] Aug. 10, 1976

[54] ELECTRICALLY HEATED TRANSPARENT LAMINATED GLAZING UNIT

[75] Inventors: Dee R. Orcutt; Kenneth C. Collier, both of Huntsville, Ala.

[73] Assignee: PPG Industries, Inc., Pittsburgh, Pa.

[22] Filed: June 9, 1975

[21] Appl. No.: 585,417

[52] U.S. Cl. .............................. 219/522; 219/203; 219/543; 219/541; 219/544
[51] Int. Cl.² ....................................... H05B 3/06
[58] Field of Search ........... 219/203, 345, 522, 541, 219/543, 544, 547; 428/38

[56] References Cited
UNITED STATES PATENTS

| | | | |
|---|---|---|---|
| 2,490,433 | 12/1949 | Gunning et al. | 219/522 |
| 2,507,036 | 5/1950 | McCrumm et al. | 219/203 |
| 2,650,976 | 9/1953 | Gaiser et al. | 219/522 |
| 2,813,960 | 11/1957 | Egle et al. | 219/544 X |
| 2,853,589 | 9/1958 | Crooke | 219/547 X |
| 2,991,207 | 7/1961 | Miller | 219/203 |
| 3,356,833 | 12/1967 | Orcutt | 219/522 |
| 3,749,309 | 7/1973 | Gruss | 219/522 |

*Primary Examiner*—Volodymyr Y. Mayewsky
*Attorney, Agent, or Firm*—Edward I. Mates

[57] ABSTRACT

A laminated glass-plastic glazing unit suitable for aircraft is disclosed. The unit comprises a pair of sheets of rigid transparent material such as glass and an interlayer of thermoplastic material that is susceptible to crack at low temperatures and that has a higher coefficient of thermal expansion than the sheets of rigid transparent material. Electrical resistance material preferably in the form of thin metal wire, is embedded within the interlayer and disposed locally in areas along a pair of opposite marginal edges of the interlayer and electrically energized to heat the interlayer portion adjacent thereto sufficiently to overcome the tendency of the interlayer to pull chips from the marginal portion of one or both of the rigid sheets when the unit is subjected to extremely low temperature conditions in a high-flying aircraft. The electroconductive material is embedded within the interlayer in spaced relation to a transparent electroconductive coating on one of the glass sheets for heating the glazing unit to dissipate mist or frost and is located relative to the thickness of the interlayer in a plane that is closer to the rigid sheet more likely to become damaged when the unit is exposed to the aforesaid low temperature conditions. The interlayer may also include a metal reinforcement frame in heat exchanging relation to the electroconductive material that extends to the edge of the interlayer to conduct heat received from the electroconductive material to the edge of the interlayer, thereby retarding the cooling of the edge of the interlayer to a temperature at which it cracks.

10 Claims, 5 Drawing Figures

ELECTRICALLY HEATED TRANSPARENT LAMINATED GLAZING UNIT

BACKGROUND OF THE INVENTION

1. Field of the Invention

The present invention relates to laminated safety glass glazing units of the type that are normally used in aircraft. A typical aircraft window is a laminated unit comprising a cover plate, an interlayer and a pressure plate. The cover plate is usually an outer glass sheet having a transparent electroconductive coating on its inner surface interconnecting a pair of bus bars mounted along longitudinal edges of said inner surface with a lead wire connecting each bus bar to an electric terminal, which, in turn, is connected to a source of potential through a switch in order to provide a potential difference between the bus bars. Electrical energy applied across the bus bars is transmitted through the transparent electroconductive coating to heat the cover plate sufficiently to remove fog or even ice that forms on the outer surface of the cover plate, and, hence, the electrical circuit that includes the bus bars and the transparent electroconductive coating serves as a defogging or deicing device. A typical aircraft panel of this type is similar to that of U.S. Pat. No. 3,081,205 to Norman Shorr.

Other aircraft panels dispense with the coating on a glass sheet surface and use a network of fine wires embedded throughout substantially the entire extent of the interlayer to form an electroconductive heating circuit connected between spaced bus bars. U.S. Pat. No. 2,813,960 to Arthur Egle and Walter Bethge shows this type of laminated window.

The pressure plate is usually an inner glass sheet that is usually both larger and thicker than the cover plate, with its marginal portion beyond the margin of the cover plate held in pressurized relation against the frame in which the glazing unit is installed. The interlayer is integral with both the cover plate and the pressure plate and is usually larger than the pressure plate and is composed of a thermoplastic resin. The interlayer is usually reinforced by a metal frame embedded therein that extends around the marginal portion of the unit. A reinforcing frame surrounds three sides of the pressure plate and the fourth side of the latter is received directly in the aircraft frame. Bolt holes in the metal frame and in the reinforcing frame are aligned with holes along the marginal portion of the frame in which the unit is installed in an aircraft. Thus, aircraft windows or units are attached to and held against the frame of the aircraft about their marginal portion only.

Aircraft windows are normally exposed to severe temperature variations in use. At high altitudes, the outer surface of the unit is exposed to low temperature and low pressure, whereas the coated surface of the cover plate is at the elevated temperature of the coating and the inner surface of the pressure plate, that is, the surface of the pressure plate exposed to the interior of the aircraft, is exposed to the pressurized condition and the moderate temperature within the aircraft. The interlayer has a higher coefficient of thermal expansion than either glass sheet of the unit. Hence, the interlayer tends to contract more rapidly than the glass during exposure to the low temperatures at high altitudes when the aircraft is in flight. This difference in contraction causes the glass to be stressed as the plastic interlayer tends to shrink away therefrom, thereby causing stresses in the glass sheets, particularly in the vicinity of the bus bars bonded to the face plate along the inner side thereof and within the extended portion of the pressure plate beyond the edge of the face plate. Furthermore, additional stresses arise from the pressure differential between the pressurized cabin and the low pressure outside the aircraft, from impact with objects in flight, from other local high stress points resulting from mechanical or thermal stresses due to non-uniform application of adhesive used to bond adjacent portions of the panel to one another and to the frame, from voids in the adhesive, from locally applied loads, from non-uniformity of electroconductive coating of the defogging device when the latter is operated, from thermal shock, and from thermal gradients due to speed, altitude or the manner of operating the aircraft.

Whatever the causes of the stresses, the fact that the interlayer tends to contract more rapidly than the glass enhances these local stresses and causes the glass to be additionally stressed, particularly around the marginal portion thereof. This difference in thermal contraction results in the plastic interlayer tending to shrink away from the marginal portion of the glass and results in chips formed on the glass surface. This tendency to chip is known in the art as "cold chipping". Sometimes these stresses are so great as to cause complete fracturing of the glass.

"Cold chipping" is especially inherent in laminated windows having rigid transparent panels of unequal size. This inherent characteristic has been attributed to the lack of balance on opposite sides of the plastic interlayer due to the difference in dimensions between the cover plate and the pressure plate.

Another problem experienced in laminated glazing units exposed to extremely low temperatures is the tendency of the polyvinyl butyral interlayer to crack along its edges, particularly along the edges that interconnect the edges of the unit along which bus bars are applied.

2. Description of the Prior Art

The problem of "cold chipping" has been recognized and many solutions have been proposed in the prior art. For example, U.S. Pat. Nos. 2,584,859 to Gaiser and 2,650,976 to R. A. Gaiser et al. disclose applying a special tape or strip material as a parting material at the marginal portion of the unit, either at the marginal portion of a glass-plastic interface, but particularly over the area of the electrode on the glass to avoid or minimize the possibility of electrode failure in such units due to the differential contractions between the plastic interlayer and the portion of the glass sheet on which the bus bar is mounted.

Applying a strip or tape of parting material along the edges of the unit interconnecting the edges along which the bus bars are applied does not reduce the effect of cracking of the polyvinyl butyral interlayer when the unit is cooled to low temperatures when in use.

U.S. Pat. No. 2,758,042 to Richard F. Raymond and Emil A. Fusca discloses incorporating a balancing strip in the interlayer of a laminated unit on the side opposite the marginal area of the larger pressure plate that extends beyond the margin of the cover plate to reduce cold chipping. U.S. Pat. No. 2,991,207 to Philip A. Miller discloses slitting the interlayer in spaced relation to the interfacial surface between the glass and the interlayer as another solution to the cold chipping problem.

Another solution proposed to eliminate cold chipping and cracking of the interlayer along its edges was to enclose the unit within an electroconductive wire and selectively heat the margin of the unit by radiation from the heated wire.

Such proposals provided some improvement in cold chipping and/or reduced cracking of the interlayer margin somewhat. However, they still left something to be desired in the reduction of "cold chipping" of the glass and cracking of the plastic interlayer margin, particularly at the lower temperatures experienced by aircraft windows flying at higher elevations than previously.

SUMMARY OF THE INVENTION

According to the present invention, electroconductive material is embedded in the interlayer locally along each of the opposite edges of the unit extending from the vicinity of one bus bar to the vicinity of the other bus bar but in spaced relation thereto relative to the thickness of the interlayer material. Power is applied to the electroconductive material at the same time power is applied to the bus bars so that the interlayer material does not become as cold in the vicinity of the embedded electroconductive material as it normally does in the absence of the additional electroconductive material. As a consequence, the interlayer portion adjacent the electroconductive material is not subject to as much brittleness as has been previously experienced in service and also is not induced to contract thermally to the extent formerly experienced as a result of the subjection of the laminated unit of the low temperatures of the outside atmosphere at high altitudes in flight.

When the units are non-rectangular, it is extremely difficult for the transparent electroconductive coating the bus bars to supply uniform heat to the unit. In particular, the marginal areas of the unit adjacent corners where the side edges form acute angles are difficult, if not almost impossible, to heat. Heat radiated by the transparent electroconductive coating reduces the amount that the interlayer cools when the aircraft is in service, thus tending to reduce the difference in contraction between the interlayer and the glass. However, in non-rectangular units, there is little heat, if any, in the areas adjacent the acute angle corners of the unit. Hence, non-rectangular units tend to have considerable cold chipping in these areas. The present invention provides local heat into these acute angle corners of the unit to reduce the tendency of the unit to be damaged by cold chipping and cracking of the plastic interlayer at its marginal portion.

When the laminated windows are of non-rectangular outline, it is especially important that additional heat be provided along the outer edges of the shorter ends that extend obliquely of the non-rectangular window for two reasons. One is to reduce thermal contraction of the interlayer in the acute angle corners of the unit, and two is to resist cracking and brittleness of the interlayer. Heating the interlayer from within its thickness accomplishes these objectives more efficiently than when an external heat source is used.

In a particular embodiment of the invention, where the window is provided with an elongated dimension and a narrow dimension, the bus bars for heating the electroconductive coating on the cover plate extend along the opposite edge portions of the longitudinal longer dimension and the electroconductive material embedded locally within the interlayer adjacent each shorter edge portion is in the form of an embedded heating wire comprising a series of reversely extending essentially parallel runs that extend in side by side spaced relation in elongated areas adjacent to the relatively narrow edge portions of the other dimension of the panel. The electroconductive material embedded within the interlayer extends obliquely from the vicinity of one bus bar to the vicinity of the other bus bar to heat the edge portions of the interlayer that are liable to crack and particularly to heat the acute angle corners of the interlayer where the additional electroconductive material is especially needed to supply heat. These and other details of the present invention will be understood after the reader has an opportunity to study a description of preferred illustrative embodiments of the present invention which follows.

BRIEF DESCRIPTION OF THE DRAWINGS

In the drawings which form part of the description of the illustrative embodiment and wherein like reference numbers refer to like structural elements.

Figure 1:
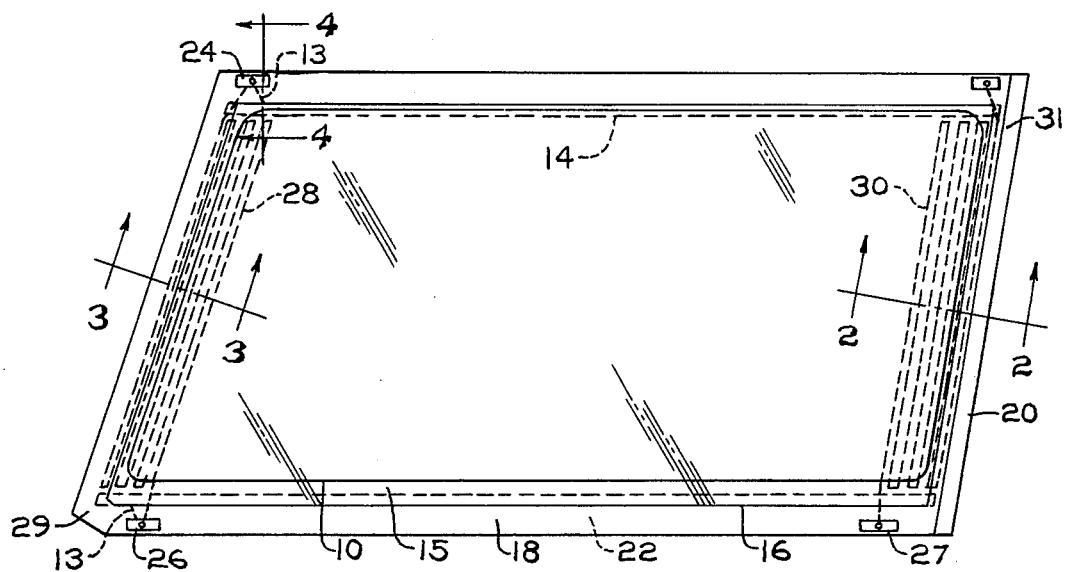
FIG. 1 is a plan view of a typical illustrative embodiment of the present invention.
Figures 2, 3:
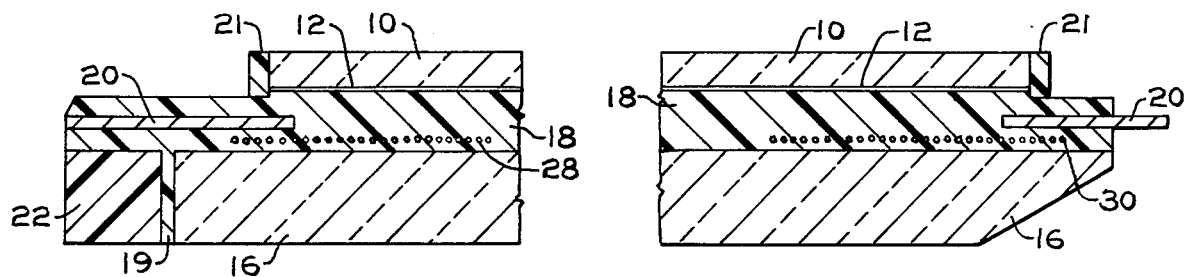
FIGS. 2, 3 and 4 are fragmentary sectional views taken along the lines 2—2, 3—3, and 4—4, respectively, of the embodiment shown in FIG. 1, with parts not essential to the present invention omitted for clarity.
Figure 4:
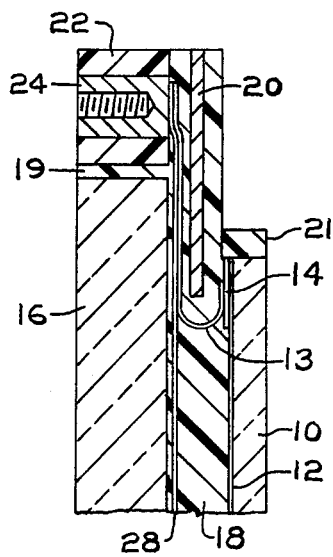

It is understood that the illustrative embodiment of the present invention omits various features that are incorporated in a commercial laminated glazing unit for aircraft which form no part of the present invention such as devices for attaching the aircraft panel unit to the frame of the aircraft and the aircraft frame itself. The present disclosure is limited to those elements of the structural unit that relate to the present invention for ease in understanding the present invention.

Referring to the drawings, the unit comprises an outer relatively small cover plate 10 of glass having on its interior surface a transparent electroconductive coating 12. A preferred coating is a transparent metal oxide such as tin oxide produced by the method described in U.S. Pat. No. 3,107,177 to Saunders and Wagner, the disclosure of said coating and its method of fabrication being incorporated herein by reference to said patent. Other suitable coatings containing tin and indium and their method of preparation are disclosed in U.S. Pat. No. 3,655,545 to Gillery and Pressau. Other suitable coatings could be gold, silver, and other transparent, electroconductive, metallic and metallic oxide coatings well known in the art.

Insulated lead wires 13 are connected to each of a pair of bus bars 14 and 15. The latter are preferably of ceramic silver of the type disclosed in U.S. Pat. No. 2,648,754 to Lytle, applied by silk screening and fused to the inner surface of the cover sheet 10. Bus bar 14 extends along one longitudinal edge portion of the cover plate 10 and bus bar 15 extends along the longitudinal edge portion opposite to the one longitudinal edge portion. The bus bars are in electrical contact with the coating 12.

Aircraft panels are also provided with temperature sensors that control the operation of the heating circuit for the defogging or deicing device. A typical sensor disclosed in U.S. Pat. No. 3,789,191 to Spindler has its electrical resistance dependent on temperature so as to control the maximum temperature the panel attains in service. The details of the sensor form no part of the present invention, but the sensor is mentioned since it normally is included in commercial aircraft glazing units.

The unit also comprises a pressure plate 16 which is usually in the form of a glass sheet having a greater thickness and size than the cover plate 10. An interlayer 18 preferably of polyvinyl butyral or a polyurethane plastic resin has a central portion integral with the cover plate 10 and the pressure plate 16 in the region where the cover plate and the pressure plate are aligned with one another, a peripheral portion extending from said central portion beyond the entire margin of the cover plate 10 and beyond three sides of the pressure plate 16 with an offset portion 19 abutting the marginal edge surfaces of the aforesaid three sides of the pressure plate.

A reinforcing frame 20 of a heat-conducting metal such as aluminum or stainless steel or the like is disposed within the marginal portion of the unit. The frame 20 is actually embedded within the interlayer and its width extends from the outer margin of the interlayer 18 throughout the peripheral portion and slightly into the central portion that is integral with both the cover plate and the pressure plate to reinforce the interlayer.

A bumper strip 21 of silicone surrounds the entire periphery of cover plate 10. An additional frame member 22 of phenolic block surrounds the offset portion 19 abutting said three sides of the pressure plate 16. The fourth side of the pressure plate is chamfered to the geometry of the aircraft frame to which it is sealed directly. A series of apertures (not shown) are provided in the reinforcing frame 20 and the additional frame 22 in alignment with the apertures contained in the aircraft body in which the unit is installed so as to enable one to insert bolts therethrough for installing the unit to the aircraft. The elements of the glazing unit bolted to the aircraft directly, such as the frames 20 and 22 and the interlayer 18, and the framing of the aircraft (not shown) are well known in aircraft glazing and are not shown in detail in order to clarify the showing of the gist of present invention.

Bus bar 14 is connected to a pair of terminals 24 and 25 and bus bar 15 to another pair of terminals 26 and 27 by the insulated lead wires 13. The terminals 24 and 25 are adapted to be connected to one side of a source of potential and terminals 26 and 27 are adapted to be connected to the other side of the source of potential. The additional frame 22 is provided with inlets to receive blocks for the terminals 24, 25, 26 and 27 in such a manner that the blocks are flush with the inner surface of the frame 22. The lead wires 13 from the bus bars 14 and 15 to the terminals are suitably enclosed in insulating material, preferably of the type disclosed in U.S. Pat. No. 3,410,739 of Orcutt, to avoid grounding the bus bars.

According to the present invention, electroconductive heating means 28 in the form of a continuous, elongated, sinuous, thin metal wire that comprises a plurality of parallel, reversely curved runs extending back and forth many times within a heating area extending between an obtuse angle corner area near terminal 24 and an acute corner 29 near terminal 26, and additional electroconductive heating means 30 in the form of another elongated sinuous thin metal wire is similarly provided within a heating area extending between an acute angle corner 31 near the terminal 25 and an obtuse angle corner near the terminal 27.

Figure 5:
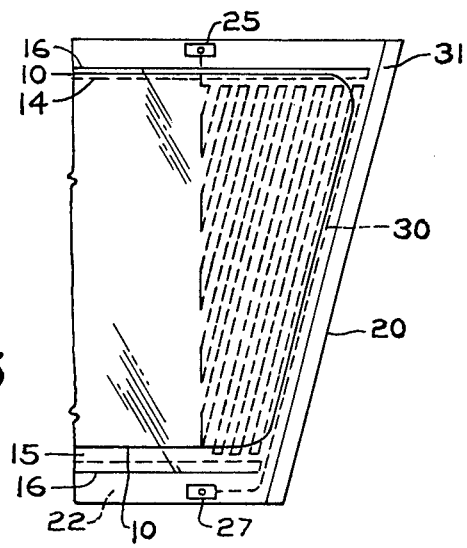
FIG. 5 is a fragmentary plan view of an alternate embodiment of the present invention.

In the embodiment of FIG. 1, the wire extends back and forth in an elongated area in the form of a parallelogram. In the embodiment of FIG. 5, the wire extends within an area in the form of a right triangle with the hypotenuse approximately parallel to the oblique edge of the panel, one leg approximately parallel to the bus bar in the region of the acute angle corner 31 and the other leg of the triangular area containing the wire extends approximately normal to the bus bars. The wire is embedded in areas having acute angle corner portions similar to the acute angle corner portions of the unit. The areas have inner portions facing both the cover plate 10 and the pressure plate 16 and outer portions facing only the marginal portion of the larger pressure plate 16.

The heating means are embedded within the thickness of the interlayer sufficiently close to the metal reinforcing frame 20 to have a heat exchanging relation therewith and in closer relation to the pressure plate 16 than to the cover plate 10 when the pressure plate is more prone to cold chipping than the cover plate. Thus, when an electric potential is applied between the bus bars 14 and 15 to energize the transparent electroconductive coating 12 on the inner surface of the cover plate 10 through bus bars 14 and 15, heat is imparted to the elongated areas through electrically parallel circuits containing the electroconductive heating means 28 and 30 in close adjacency to the surface of the pressure plate 16 and the marginal edges of the interlayer 18. Thus, the portion of the interlayer 18 adjacent the edges of the pressure plate 16 that extend along the short sides of the unit are maintained at a temperature higher than they would attain normally when heating means 28 and 30 are absent and the deicing unit containing the transparent electroconductive coating 12 on the inner surface of the cover plate is energized. Therefore, there is less tendency for the pressure plate 16 to be subjected to cold chipping than was the case in the prior art.

Likewise, there is less tendency for the interlayer to crack along the shorter ends of the unit by virtue of the heat imparted to the edge portions of the interlayer by heating means 28 and 30 embedded therein. The triangular areas including acute angle corners 29 and 31 of the interlayer 18 may be heated more intensely than the rest of the interlayer by providing runs of the wires of different length in the vicinity of these acute angle corners where the nature of the construction of the unit and the severity of temperatures of use necessitate. FIG. 5 shows an illustrative example of how a heating wire forming electroconductive heating means 30 is arranged to heat a triangular area including an acute angle corner 31.

In order to provide a suitable embodiment of the present invention, a typical unit will now be described.

In a typical unit the cover plate was a glass sheet 3/16 inch (about 4.6 millimeters) thick cut to the outline shown in FIG. 1 from a rectangular block size approximately 38 inches (about 965 millimeters) long and about 18 inches (about 457 millimeters) wide, the pressure plate was cut to the outline shown from a rectangular block size 40 inches (1016 millimeters) long, 21 inches (about 513 millimeters) wide and ½ inch (12.7 millimeters) thick. The interlayer 18 was composed of polyvinyl butyral plasticized with 21 parts by weight of triethylene glycol di(2-ethyl butyrate) per 100 parts polyvinyl butyral and had a thickness of 0.380 inches (about 9.65 millimeters). The reinforcing inserts 20 were aluminum inserts 0.080 inch (approximately 2 millimeters) thick extending from the outer periphery of the unit to an inner border aligned with a plane through the thickness of the unit that intersected 0.187 inch (approximately 4.5 millimeters) inside the cover plate in a plane near the center of the thickness of the unit.

The electroconductive heating means 28 and 30 comprise a pair of wires each of molybdenum-tungsten alloy 0.0015 inch (approximately 0.04 millimeter) in diameter disposed in a plane about 0.080 inch (2 millimeters) from the adjacent surface of the pressure plate. The electroconductive heating means was thus positioned sufficiently close to the metal reinforcing inserts 20 so as to be in heat exchanging relation therewith. The inserts 20 thus helped to heat the marginal portion of the interlayer 18 by absorbing heat radiated by the heating means 28 and 30 and conducting the heat through the reinforcing frames 20 to the marginal portion of the interlayer 18.

The unit was constructed to have a non-rectangular quadrilateral outline with its longitudinal edges disposed approximately parallel to one another and the bus bars 14 and 15 extending along the opposite longitudinal edges thereof. The transverse edges were angled obliquely in non-parallel relation to one another from longitudinal edge to longitudinal edge so that one of the oblique edges was a little longer than the other oblique edge. The elongated wire constituting the electroconductive heating means along each of the shorter oblique edge consisted essentially of a single wire extending over 1000 inches (25,400 millimeters) in length in a back and forth array of closely spaced lines covering an area having a width of about 2 inches (50.8 millimeters). These single continuous wires were embedded within the thickness of the interlayer 18 about 0.080 inches (2 millimeters) from the pressure plate 16. Where the oblique edges extending from the corners 29 and 31 have different lengths, the same heat may be applied by providing additional runs of the reversely curved wire along the shorter area than in the longer area. For example, where the unit is 16 inches long on one side and 17 inches long on the other side, a continuous wire having 65 runs was embedded along the 16 inch long side and one having 61 runs embedded along the 17 inch long side with acceptable results. The length of continuous wire, the spacing between runs, the number of wires used in each area and the electroconductivity per unit length of heating wire are so chosen as to provide a pattern of heating per unit area that provides more heat where needed as in the acute angle corners 29 and 31 in a manner well known to those skilled in the electrical art.

In flight, a nominal voltage of 285 volts was applied between the bus bars to supply a heating pattern to the transparent electroconductive coating with added heat patterns along the elongated areas where the heating wires of the heating means 28 and 30 were embedded. The parallel flows of current through the embedded, elongated wires of the additional electroconductive heating means 28 and 30 provided sufficient heat along the localized, elongated areas of the interlayer 18 to avoid cold chipping and the interlayer cracking.

In tests performed in a cold chamber maintained at −40°F. (−40°C.) for an hour while applying voltage from bus bar to bus bar under normal service condition, the temperature of the interlayer at four control points in areas 29 and 31 were 36° to 41°F. (20° to 23°C.) higher when the elongated wires of heating means 28 and 30 were energized to provide local heat in elongated areas compared to the respective temperatures at these control points for units in which localized heat was not provided in the elongated areas, but provided only to the transparent electroconductive coating on the inner surface of the cover plate.

It is noted that there is sufficient thickness of the interlayer between the transparent electroconductive coating on the cover plate and the heating wires to electrically insulate the heating wires forming the electroconductive heating means from the transparent electroconductive coating 12 on the inner surface of the cover plate 10. This electrical insulation permits one to design a panel where the power supplied by the potential difference between bus bars 14 and 15 can be divided at any desired ratio between the power dissipated by the current through the transparent electroconductive coating on the coated glass sheet of the unit and the power dissipated by the current passing through the wires of the electroconductive heating means 28 and 30.

In the case of non-rectangular aircraft glazing units, it is particularly helpful to have the electroconductive heating means disposed to heat diagonally extending areas of the interlayer adjacent its edges, particularly the corners of the unit that form acute angles where there is likely to be less current flowing than the current that flows between the portions of the bus bars that oppose one another as in rectangular units.

The wires are mounted so that a portion thereof is aligned opposite the extended portion of the larger glass sheet which forms the pressure plate 16, which would not receive much heat from that radiated by the coating on the cover plate because the extended portion does not face the coating 12. The embedded wires of the electroconductive heating means provided according to the present invention furnish additional heat to the interlayer and the larger glass sheet of the unit where needed to reduce the greater tendency for chill cracking in the areas of rectangular or non-rectangular units at a greater distance from the heated areas of the transparent electroconductive coating on the cover plate than in the area of the pressure plate that faces and is heated by the high current area of the coating on the cover plate.

In units having a non-metallic reinforcing frame 20, the heating wires may be embedded within the frame, which, in turn, is embedded within the interlayer. Such units do not furnish the added heat resulting from conduction in the metal frame of the illustrative embodiment, but for lighter aircraft designed for lower altitudes, such wiring is sufficient to accomplish the purposes of the present invention.

While a plasticized polyvinyl butyral was mentioned as the interlayer material, polyurethane compositions have also been accepted as interlayers, particularly those polyurethanes disclosed in U.S. Pat. No. 3,808,077 to Rieser and Chabal. The latter patent also discloses various plasticizers for polyvinyl butyral and the disclosure of the laminating materials, plasticizers therefor and the method of making the interlayers disclosed therein are incorporated herein by reference insofar as the disclosure of the aforesaid patent relates to these items.

The form of the invention shown and described in this disclosure represents an illustrative preferred embodiment and variations thereof. It is understood that various changes may be made without departing from the gist of the invention as defined in the claimed subject matter which follows.

We claim:

1. A transparent laminated glazing unit comprising two glass sheets, an interposed thermoplastic interlayer integral with both of said glass sheets, a transparent electroconductive heating coating and a pair of bus bars bonded to the surface of one of said glass sheets facing said interposed thermoplastic interlayer, said bus bars extending along each of a pair of opposite edges of said glass sheet, electroconductive heating means extending in localized, elongated areas adjacent to the other pair of opposite edges of said glass sheet and embedded in said interposed thermoplastic interlayer between said glass sheets in spaced relation to said coating, said space being measured in the direction of the thickness of said interlayer, electrical means including electrical terminals adapted for connection to electrical potential source means and electroconductive means to connect said transparent electroconductive heating coating and said electroconductive heating means to said electrical terminals to form electrical heating circuits, whereby, when said electrical terminals are connected to said electrical potential source means, electrical current flows through said transparent electroconductive heating coating and said electroconductive heating means to evolve heat in said transparent electroconductive heating coating and each of said electroconductive heating means.

2. A transparent laminated glazing unit as in claim 1, wherein said glass sheets are of different size, said smaller glass sheet is coated and said electroconductive heating means is embedded in said interlayer closer to said larger glass sheet.

3. A transparent laminated glazing unit as in claim 1, wherein said electroconductive means connect said electroconductive heating means and said coating to said electrical terminals to form electrical heating circuits in electrical parallel between said bus bars.

4. A transparent laminated glazing unit as in claim 1, further including a metal reinforcing frame embedded in said interlayer in sufficiently close spacing to said electroconductive heating means to be in heat exchanging relation therewith yet sufficiently spaced therefrom to be electrically insulated therefrom by a portion of the thickness of said interlayer.

5. A transparent laminated glazing unit as in claim 1, wherein said electroconductive heating means comprises a pair of elongated heating wires, each wire of said pair electrically connected between one of said bus bars and the other of said bus bars and located substantially entirely within localized areas adjacent another opposite pair of edges of said unit extending between the edges along which the bus bars extend.

6. A transparent laminating glazing unit as in claim 1, which comprises a pair of approximately parallel elongated edges and a pair of connecting edges, wherein said bus bars extend along the edge portions of said approximately parallel edges and said electroconductive heating means are disposed in areas that extend in close relation to and approximately parallel to the respective connecting edges between said approximately parallel edges.

7. A transparent laminating glazing unit as in claim 6, wherein said electroconductive heating means are coupled electrically between said bus bars to form electroconductive heating elements in electrical parallel to said transparent electroconductive heating coating.

8. A transparent laminated glazing unit as in claim 7, wherein said unit is non-rectangular and said connecting edges have different lengths and said electroconductive heating means comprise a pair of wires reversely looped to provide substantially equal lengths of wire with a wire of said pair disposed in one or the other of said areas in the vicinity of the opposite connecting edges.

9. A transparent laminating glazing unit as in claim 8, wherein said glass sheets are of different size and at least a portion of said electroconductive heating means is aligned with a portion of the area of the larger glass sheet that extends beyond the margin of the smaller glass sheet of said unit.

10. A transparent laminated glazing unit as in claim 9, wherein said unit has sides forming corner portions having acute angles and said heating means is located in areas acute angle corner portions similar to said unit corner portions so that portions thereof are in heat exchanging relation with said corner portions.

* * * * *

UNITED STATES PATENT AND TRADEMARK OFFICE
CERTIFICATE OF CORRECTION

PATENT NO. : 3,974,359
DATED : August 10, 1976
INVENTOR(S) : Dee R. Orcutt and Kenneth C. Collier It is certified that error appears in the above-identified patent and that said Letters Patent are hereby corrected as shown below:

Column 3, line 35, after "coating", please insert --connecting--.

Column 5, line 65, after "acute", please insert --angle--.

Column 10, Claim 10, line 44, after "areas", please insert --having--.

Signed and Sealed this

Second Day of November 1976

[SEAL]

Attest:

RUTH C. MASON
*Attesting Officer*

C. MARSHALL DANN
*Commissioner of Patents and Trademarks*